United States Patent
Sogge (10) Patent No.: US 6,940,275 B2
(45) Date of Patent: Sep. 6, 2005

(54) MAGNETIC POSITION SENSOR APPARATUS AND METHOD

(75) Inventor: Dale R. Sogge, Wrentham, MA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/736,972

(22) Filed: Dec. 15, 2003

(65) Prior Publication Data

US 2005/0127903 A1 Jun. 16, 2005

(51) Int. Cl.$^7$ .............. G01B 7/14; G01B 7/30; G01R 33/06; H01L 43/06
(52) U.S. Cl. ................ 324/207.2; 324/207.21; 324/207.25
(58) Field of Search ........... 324/207.2, 207.21, 324/207.23, 207.24, 207.25, 207.26, 207; 33/1 N, 1 PT (56) References Cited

U.S. PATENT DOCUMENTS

| | | | | |
|---|---|---|---|---|
| 2,347,563 A | * | 4/1944 | Keller ................... | 322/34 |
| 3,194,990 A | * | 7/1965 | Kendall ................. | 310/10 |
| 4,492,922 A | * | 1/1985 | Ohkubo ................ | 324/207.21 |
| 4,769,597 A | * | 9/1988 | Sano .................... | 324/207.25 |
| 5,444,369 A | * | 8/1995 | Luetzow ............... | 324/207.2 |
| 5,528,139 A | | 6/1996 | Audet et al. | |
| 5,789,917 A | * | 8/1998 | Oudet et al. .......... | 324/207.2 |
| 5,861,745 A | * | 1/1999 | Herden ................. | 324/207.2 |
| 5,943,639 A | * | 8/1999 | Tanaka et al. ........ | 702/163 |
| 6,130,535 A | * | 10/2000 | Herden et al. ........ | 324/207.2 |
| 6,201,389 B1 | * | 3/2001 | Apel et al. ............ | 324/207.2 |
| 6,232,771 B1 | * | 5/2001 | Herden et al. ........ | 324/207.25 |
| 6,310,473 B1 | * | 10/2001 | Zhao .................... | 324/207.25 |
| 6,323,642 B1 | * | 11/2001 | Nishimura et al. ... | 324/207.2 |
| 6,326,780 B1 | * | 12/2001 | Striker ................. | 324/207.21 |
| 6,414,482 B1 | * | 7/2002 | Mase ................... | 324/207.2 |
| 6,479,987 B1 | * | 11/2002 | Marx et al. .......... | 324/207.2 |
| 6,509,734 B1 | * | 1/2003 | Luetzow ............... | 324/207.2 |
| 6,566,860 B1 | | 5/2003 | Lin et al. | |
| 6,593,734 B1 | * | 7/2003 | Gandel et al. ....... | 324/207.25 |
| 6,642,710 B2 | * | 11/2003 | Morrison et al. ..... | 324/207.12 |

FOREIGN PATENT DOCUMENTS

EP 0830583 8/2003

* cited by examiner

Primary Examiner—Edward Lefkowitz
Assistant Examiner—Kenneth J Whittington
(74) Attorney, Agent, or Firm—Russell E. Baumann; Frederick J. Telecky, III (57) ABSTRACT

A magnetic position sensor has a stator (16', 36, 52) formed of magnetic material and a pair of magnets (14a, 14b; 34a, 34b; 54a, 54b; 64a, 64b) rotatably mounted about the stator and movable between opposite angular extremities and spaced from the stator by a primary cylindrical air gap (5). A secondary air gap (4) is formed in a stationary member at a location at which the magnetic field varies with the angular position of the magnets. A first Hall Effect sensor (18) is disposed in the secondary air gap to measure the magnetic field there-across as an indication of the angular position of the magnets. A second reference sensor (22) is provided to detect the magnetic decay of the magnets. The second sensor can be a Hall Effect sensor disposed at a location at which the magnetic field is relatively constant, independent of the angular position of the magnets. The reference sensor output can be used as a diagnostic indicator or as a correction for the first sensor output.

4 Claims, 13 Drawing Sheets

FIG. 8
With 1 decayed magnet

MAGNETIC POSITION SENSOR APPARATUS AND METHOD

CROSS REFERENCE TO RELATED APPLICATIONS

Similar subject matter is contained in U.S. application Ser. No. 10/736,956, filed Dec. 15, 2003.

FIELD OF THE INVENTION

This invention relates generally to magnetic position sensors, particularly magnetic position sensors having an electrical output signal generally proportional to the angular position of a rotatable member.

BACKGROUND OF THE INVENTION

Magnetic sensors, such as Hall Effect sensors and magnetoresistive sensors, are well known for use in measuring the position of an element. Generally, a magnet is used to create a magnetic field which is measured by an IC (integrated circuit) containing a magnetically sensitive feature. The magnet is connected to the element to be measured and moves relative to the IC. The changing magnetic field at the IC is converted into an output signal proportional to the movement.

Magnetic based sensors have three major limitations. First, the magnet can lose strength over time and temperature, which can lead to error in the indicated position. These losses can be caused by exposure to temperature which allows some meta-stable domains to rotate or by corrosion which changes the metallurgy, or by bad processing. Secondly, the IC can drift over time and temperature or the IC can fail outright. Thirdly, existing structures for magnetic sensors are very sensitive to small changes in magnetic field that can occur with small mechanical misalignment.

An example of an effective position sensor comprises a radially magnetized permanent ring magnetic longitudinally split into opposed first and second portions with the North pole of each portion aligned in reverse orientation relative to each other and being mounted in a yoke of magnetic material for rotation with the yoke. A generally coaxial cylindrical stator, longitudinally split into first and second portions and spaced from one another by a selected secondary air gap, is disposed within and spaced from the ring magnet forming a primary air gap. A Hall sensor is disposed within the secondary air gap between the first and second stator portions. This arrangement provides a nearly linear electrical output signal proportional to the angular position of the yoke mounting the ring magnet and is not sensitive to misalignment between the rotating and stationary members. For further details, reference can be made to U.S. Pat. No. 5,789,917, the subject matter of which is incorporated herein by this reference.

Although sensors made according to the teachings of this patent are very effective, there is a limitation in their use. That is, over time the strength of the magnet decays and the Hall sensor reflects this as an angular rotation. Position sensors of this type typically use a samarium cobalt magnet. After 3,000 hours at 150 degrees C., such magnets typically experience a decrease of 2–4% in remanence. This decaying field causes a decrease of the output and thus an error in the angular position read out. Although errors of this magnitude may be acceptable in certain applications, there are many other applications in which such errors cannot be tolerated.

Attempts have been made to address this problem by running a temperature stabilization cycle on the magnets. While this has some beneficial effect in reducing aging, it does not eliminate it. Further, in order to obtain the 1–2 ppm defect level required for highest quality, stable magnets, one must have nearly perfect process controls.

SUMMARY OF THE INVENTION

An object of the present invention is the provision of a position sensor using a magnetic sensor and magnets to measure the angular position of the magnets in a manner that is stable over time. Another object of the invention is the provision of a reliable, but inexpensive, enhancement to a conventional Hall Effect position sensor which overcomes the limitations of the prior art discussed above.

Briefly stated, a position sensor made in accordance with a preferred embodiment of the invention comprises a magnet formed of two separate portions mounted on a cylindrical, tubular yoke formed of soft magnetic material in diametrically disposed relationship with each other and with the magnet portions having their North poles aligned in reverse orientation relative to each other. A cylindrical, tubular stator is formed of magnetic material and split along the longitudinal axis into four generally equal quadrant portions and separated from each other by a first supplemental air gap of a selected distance extending in one diametrical direction and a second supplemental air gap of a selected distance extending in a second diametrical direction normal to the first direction and out of alignment with the magnet portions. The stator is disposed within the tubular yoke separated from the magnet portions by a primary cylindrical air gap of a selected width. The tubular yoke is rotatable with the magnet portions moving along a selected path between first and second extremities, for example, 15 angular degrees in either rotational direction from a neutral position and with the magnet portions out of alignment with the second supplemental air gap. A first linear Hall Effect sensor is located in the first supplementary air gap with the center of the magnet portions aligned with the first gap at a zero degree location. The first Hall Effect sensor provides an electronic output, or frequently referred to herein as sense, signal that has an essentially linear dependence on the angular position of the magnet portions (to the first order) due to the guided concentration of the magnetic field, as noted in the U.S. Pat. No. 5,789,917 patent referenced above.

A second linear Hall Effect sensor is disposed in the second supplementary air gap and serves as a reference sensor. The magnetic field crossing the second supplementary air gap between two quadrants of the stator is essentially constant throughout the rotation of the magnets between the two extremities. The electrical output, or frequently referred to herein as reference, signal of the second Hall Effect sensor therefore measures the constant field. If the magnet decays, the field in the second gap will decay proportionally since there is less total available field that is shunted through the stator portions. A threshold can be set so that upon a selected decrease in the amplitude of the signal a diagnostic alert can be generated. However, in accordance with the preferred embodiment, compensation of the first electrical output signal is provided by means of the second electrical signal. The first electrical output signal is in the form of a linear equation $y=mx+b$ where m changes as the signal decays. The second electrical signal, as noted above, decays in proportion to the decay of the magnet and is used as a correction factor for the slope m.

Another advantage of this embodiment is that the reference sensor does not need to be positioned accurately. The field in the second supplementary air gap is constant across the entire gap so that side to side misalignment of the reference or second Hall Effect sensor is not critical and additionally, along with the first Hall Effect sensor, has no sensitivity to rotor play and has good shielding from external magnetic fields and excellent linearity of the signal. However, the second Hall Effect sensor does have some sensitivity to off-centering of the rotating versus the stationary components.

Figure 3:
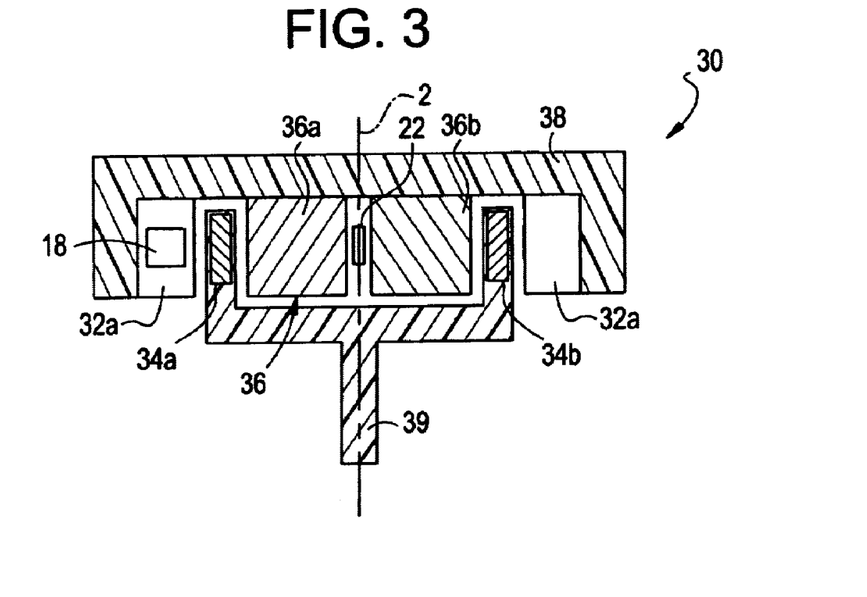
FIG. 3 is a cross sectional view taken on line 3—3 of FIG. 3a of a position sensor made according to a second preferred embodiment of the invention.
Figure 3A:
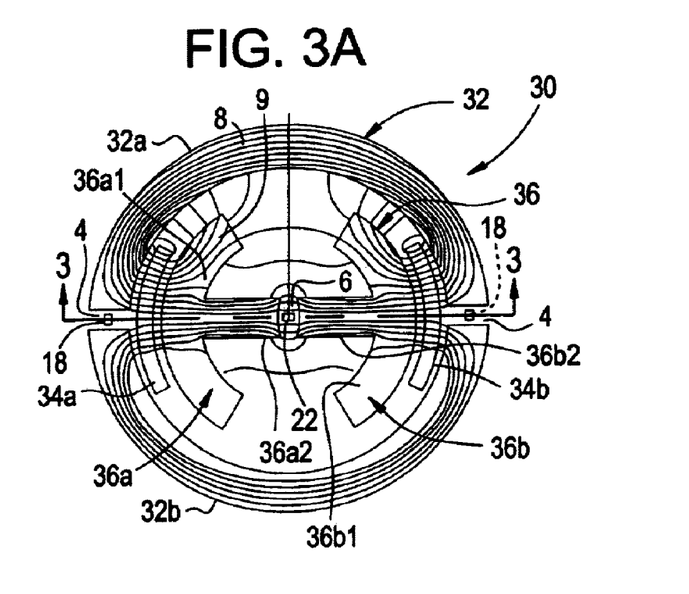
FIG. 3a is a view, similar to FIG. 1b of the FIG. 3 embodiment at the zero degree angular position.

According to another preferred embodiment shown in FIG. 3, the second or reference Hall Effect sensor is insensitive to such off-centering. In this embodiment both the yoke and the stator are stationary and the two opposed magnet portions are rotatable in the cylindrical space between the yoke and stator. The stators in plan view each have a first arc shaped portion radially spaced from a respective arc shape magnet on the side of the magnet portions facing the center of rotation and a generally linear shaped constant width second portion extending from the center of each respective first portion diametrically toward the center of rotation and being spaced from the other generally linear portion. The yoke is ring shaped, and, as in the first embodiment, formed of soft magnetic material, however, it is split into first and second semi-circular portions spaced from one another. A first linear Hall Effect sensor is placed in one of the supplementary air gaps formed between the first and second semi-circular portions of the yoke and is responsive to the rotating field resulting from a magnet moving by the gap in the yoke in the manner described in U.S. Pat. No. 5,528,139, the subject matter of which is incorporated herein by this reference. A second reference linear Hall Effect sensor is disposed in the supplementary air gap between the first and second linear portions of the stator which has a generally constant field across the gap.

In both of the above embodiments, the effectiveness of the reference Hall Effect sensors depend on a matching of the Hall Effect sensors, however, a mismatch of the sensors can cause some error. In applications requiring even more precision, another preferred embodiment employs a switch to provide an output at a selected fixed angular position which is compared to the expected output value of the first electrical output signal at that angular position to determine if there is a deviation. Deviations, if any, are applied to the first electrical signal as an offset correction factor. The second output can be obtained using a mechanical switch that closes at a selected, fixed angle according to one described preferred embodiment or an optical sensor such as a photo diode and photo detector wherein the optical signal is interrupted by the magnet rotating in front thereof.

In another preferred embodiment, the outer ring shaped yoke and the stator are stationary and first and second arcuately shaped magnets are mounted on a rotor and rotatable in the primary annular air gap formed between the yoke and stator. The yoke and stator are longitudinally split into two equal sized portions spaced from each other by respective supplemental air gaps. The magnets are rotatable between first and second extremities a selected amount, in the embodiment described 30 degrees. The supplemental air gap between the stator portion extends in a diametrical direction which forms an angle of approximately 15 degrees with the diametrical direction in which the supplemental air gap between the yoke portions extend. The flat walls of the stator portions are flared outwardly at either end of the stator supplemental air gap. The magnet portions overlap the flared walls at both extremities of their travel. At one extremity (zero stroke) the center of the arcuately shaped magnets are aligned with the supplemental air gap of the yoke. At the mid point of the magnet's stroke (half stroke) the center of the magnets are aligned with the supplemental air gap of the stator and at the opposite extremity (full stroke) the center of the magnets is out of alignment with both supplemental air gaps. The sense magnetic sensor is disposed in the center of the supplemental air gap of the stator and the reference magnetic sensor is disposed in the center of one of the supplemental air gaps of the yoke. In this arrangement, at zero stroke the flux in the supplemental air gap of the yoke (reference air gap) is zero so that a magnetic switch can be used in place of a linear magnetic sensor in the reference location.

In yet another embodiment, the outer ring shaped yoke and the stator are stationary and first and second arcuately shaped magnets are mounted on a rotor and rotatable in the primary air gap formed between the yoke and stator, as in the last embodiment referred to above. However, the yoke is not split and the stator is tubular and longitudinally split into two equal sized portions spaced from each other by a supplemental air gap in which is disposed the sense magnetic sensor. The reference magnetic sensor is placed in the gap between one of the magnets and the yoke and is aligned with the diametrical direction in which the supplemental air gap extends.

Various additional objects and advantages of the present invention will become apparent from the following detailed description and the accompanying drawings.

DETAILED DESCRIPTION OF PREFERRED EMBODIMENTS

Figure 1:
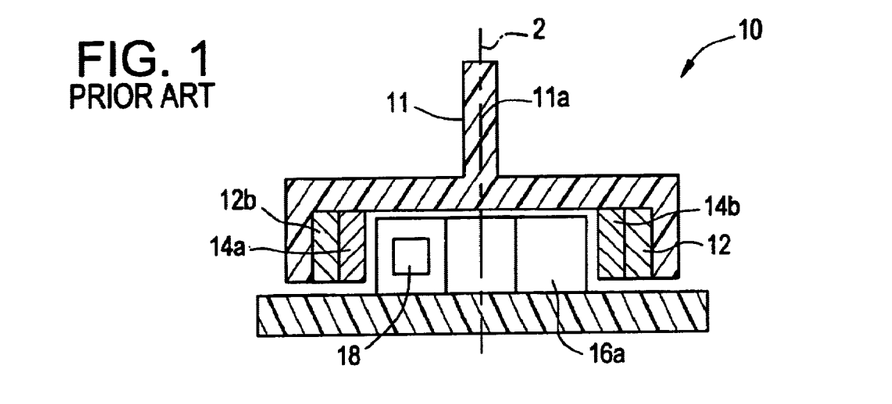
FIG. 1 is a cross sectional view taken on line 1—1 of FIG. 1a of a position sensor made according to the prior art.
Figure 1A:
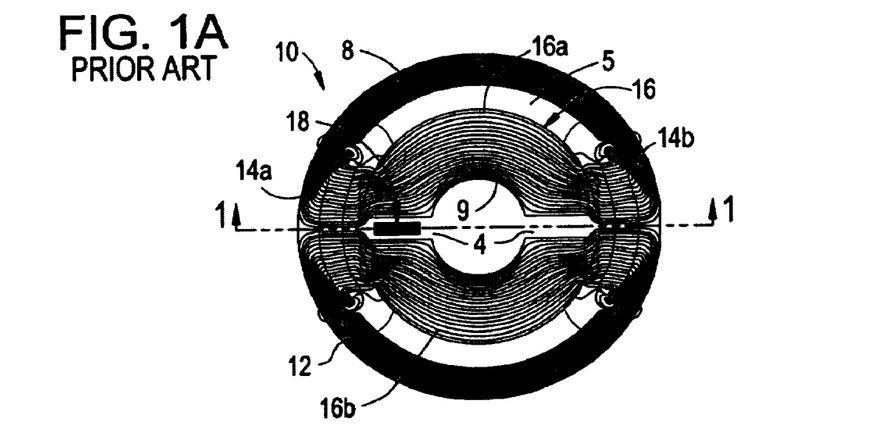
FIG. 1a is a simplified cross sectional view taken in a plane perpendicular to the FIG. 1 cross section with sensed magnets in a neutral or zero degree angular position and shown with lines indicating the magnetic field.
Figure 1B:
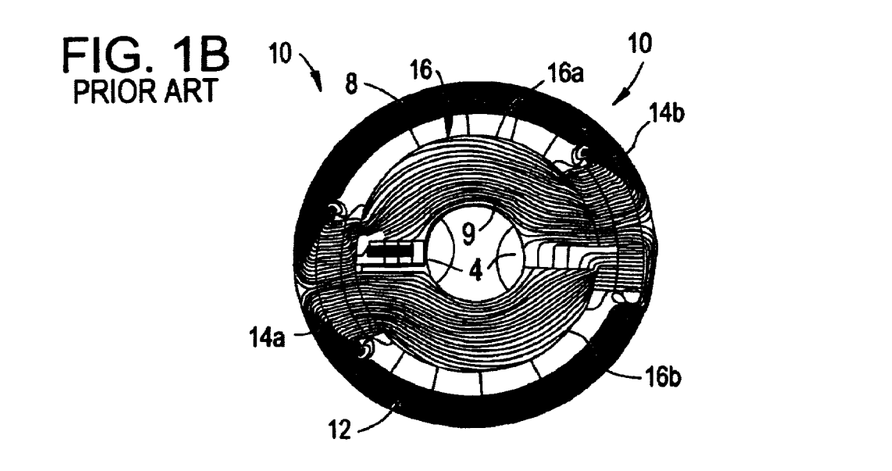
FIG. 1b is a view similar to FIG. 1a but with the sensed magnets at a fully rotated, counterclockwise extremity and shown with lines indicating the magnetic field.

A position sensor 10 made according to the teachings of the prior art, shown in FIGS. 1, 1a and 1b, comprises a rotatable member 11 formed of non-magnetic material having a drive shaft 11a and mounting a cylindrical tubular yoke 12 formed of soft magnetic material. First and second arcuately shaped permanent magnet portions 14a, 14b, made of suitable material having long lasting magnetic properties, such as samarium cobalt, are fixedly mounted on the inside of yoke 12 for rotation therewith and are disposed in diametrical opposition with one another. The magnet portions are radially magnetized so that the North poles are aligned in reverse orientation relative to each other. That is, the North pole of magnet portion 14a is on the side of that portion closest to the center of rotation (axis 2) and the North pole of magnet portion 14b is on the side of that portion furthest from axis 2. A coaxially mounted stator 16 of soft magnetic material is in the form of a cylindrical tube cut along its longitudinal axis into two equal size portions, 16a, 16b separated from one another by a supplementary air gap 4 of a selected width. Stator 16 is also spaced from yoke 12 by a first generally annular primary air gap 5. A linear Hall Effect sensor 18 is mounted in gap 4 to measure the magnetic flux crossing across the gap. Yoke 12 is rotatable between opposite angular extremities, for example, fifteen degrees in either direction from a neutral or zero degree position of FIGS. 1, 1a with Hall Effect sensor 18 in gap 4 aligned with the center of the magnet portions to a position of fifteen degrees in either direction, the extreme counter-clockwise position being shown in FIG. 1b.

It will be seen from flux lines 8 in yoke 12b and 9 in stator portion 16a, 16b, that the magnetic field has been concentrated and guided. This arrangement provides an essentially linear output (to the first order) in supplementary air gap 4 which is not sensitive to misalignment of the rotating and stationary parts and which, because of yoke 12b, is not sensitive to an external field.

However, over time the magnetic strength of the magnet decays and this decay is interpreted by a control system as a change of angular position.

Although the decay may be only on the order of a few percent, in certain applications this can be unacceptable. For example, in certain automotive transmissions, the position sensor is used to determine the position of a control element for optimum operation of the transmission.

Figure 2:
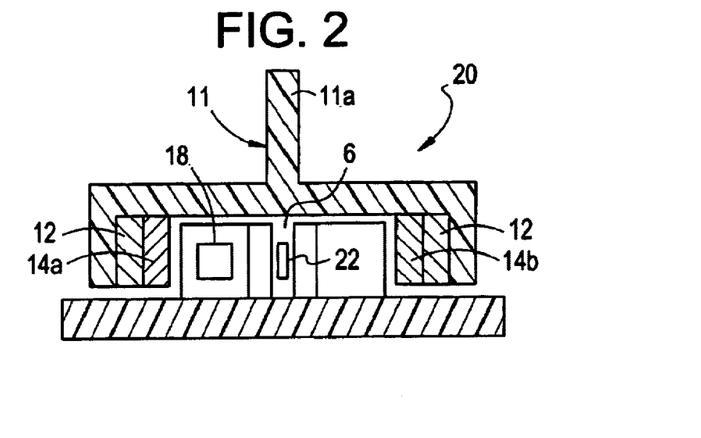
FIG. 2 is a cross sectional view taken on line 2—2 of FIG. 2a of a position sensor made according to a first preferred embodiment of the invention.
Figure 2A:
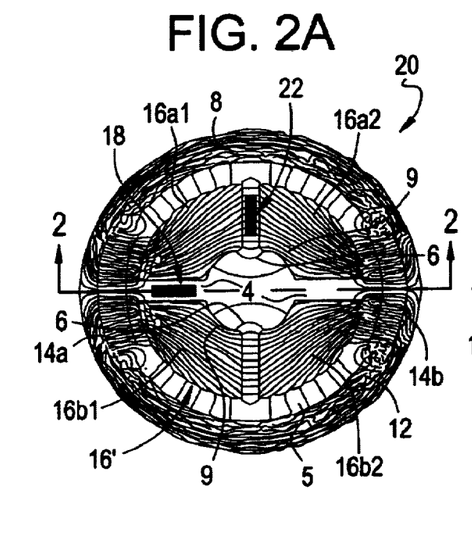
FIG. 2a is a view similar to FIG. 1a of a position sensor made according to the FIG. 2 embodiment of the invention at the zero degree angular position.
Figure 2B:
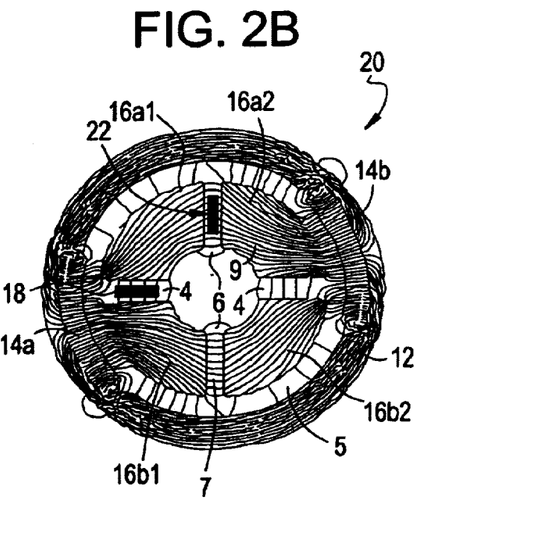
FIG. 2b is a view similar to FIG. 2a but with the sensor magnets at a fully rotated, counterclockwise extremity.

In accordance with a first preferred embodiment of the invention, as seen in FIGS. 2, 2a and 2b, the stator of position sensor 20 is split into equal quadrant portions 16a1, 16a2 and 16b1, 16b2 with quadrant portions 16a1, 16a2 separated from quadrant portions 16b1, 16b2 by first supplementary air gap 4, as in the FIG. 1 structure, and quadrant portions 16a1, 16b1 separated from quadrant portions 16a2, 16b2 by another or second supplementary air gap 6 of a selected width. First and second magnets, or magnet portions, are mounted in yoke 12 for rotation with member 11 as in the FIG. 1 structure and linear Hall Effect sensor 18 is located in air gap 4 as in the FIG. 1 structure. The yoke can be made from any soft magnetic material, such as iron, silicon-iron alloys and nickel-iron alloys. The stator portions can be made from soft magnetic material, preferably a low hysteresis material such as silicon-iron or nickel-iron.

Figure 2C:
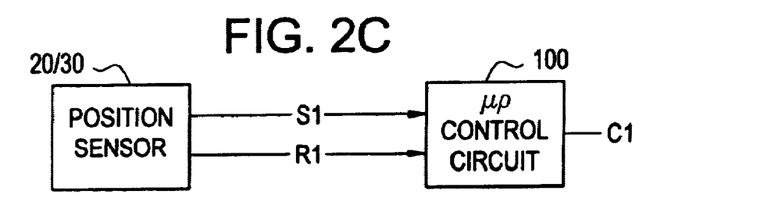
FIG. 2c is a schematic diagram of a position sensor and a control circuit for compensating the first electrical output signal of the FIG. 2 sensor based on a second, reference, electrical output signal.

A second reference linear Hall Effect sensor 22 is mounted in gap 6 for measuring the magnetic flux crossing the gap which at that location is essentially independent of the angular position of the magnetic portions, i.e., the magnetic field remains essentially constant, within a few gauss. It will be noted that air gap 4 extends in a diametrical direction which is aligned with the magnet portions during the entire rotational path of the magnet portions between its extremities and gap 6 extends in a diametrical direction which is out of alignment with the magnet portions during the entire rotational path of the magnet portions. With reference to FIG. 2c, a position sensor 20, as shown in FIGS. 2, 2a, is shown having a first Hall Effect sensor output S1 and reference Hall Effect sensor output R1 inputted to a microprocessor control circuit 100 for compensating the output S1 of the first Hall Effect sensor based on the reference signal R1, providing a compensated output C1, as will be discussed below in connection with other preferred embodiments.

There is some sensitivity of the reference Hall Effect sensor to off-centering of the rotating yoke relative to the stator in the FIG. 2 embodiment due to some of the flux crossing gap 5 at the location of closest proximity of the yoke to the stator which will slightly impact the field in gap 6 in which the reference Hall Effect sensor is located.

In the preferred embodiment of FIG. 3, position sensor 30 comprises a stationary tubular yoke or outer ring 32 formed of like material as that of yoke 12 of the FIG. 2 embodiment and mounted in a support 38 of non-magnetic material and a stationary stator 36 formed of like material as that of stator 16 of the FIG. 2 embodiment, with movable magnets 34a, 34b mounted for rotation on rotor 39 made of non-magnetic material in an annular space between yoke 32 and stator 36. Yoke 32 is longitudinally split into first and second portions 32a, 32b, respectively, separated from each other by a sense supplementary air gap 4 of a selected width and with the tubular wall surfaces being generally cylindrical having a longitudinal axis 2. Stator 36 is formed of first and second elements 36a, 36b each comprising an arcuately shaped first spaced apart portion 36a1, 36b1, respectively, and linear portion 36a2, 36b2, respectively, extending from a location intermediate to the ends of the arcuately shaped portions, preferably the center, toward but short of the center of rotation on axis 2 of the arcuately shaped portion and forming a reference supplementary air gap 6 of a selected width. Arcuately shaped first and second portions 36a1, 36b1 are spaced from yoke 32 sufficiently to locate magnets 34a, 34b therebetween while providing an air gap of a selected width between the magnets and both the stator and the yoke. The centers of arcuately shaped portions 36a1, 36b1 are preferably aligned with the diametrical direction in which air gap 4 in yoke 32 extends.

Figure 3B:
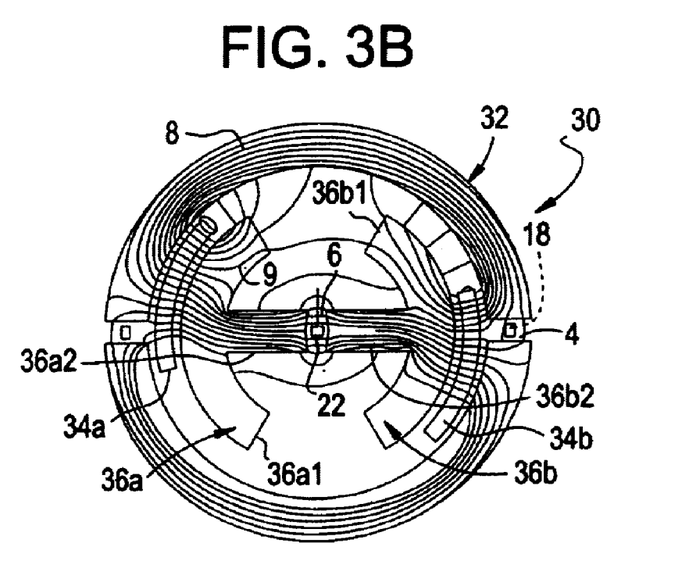
FIG. 3b is a view similar to FIG. 3a but with the sensor magnets at a fully rotated clockwise position.
Figure 3C:
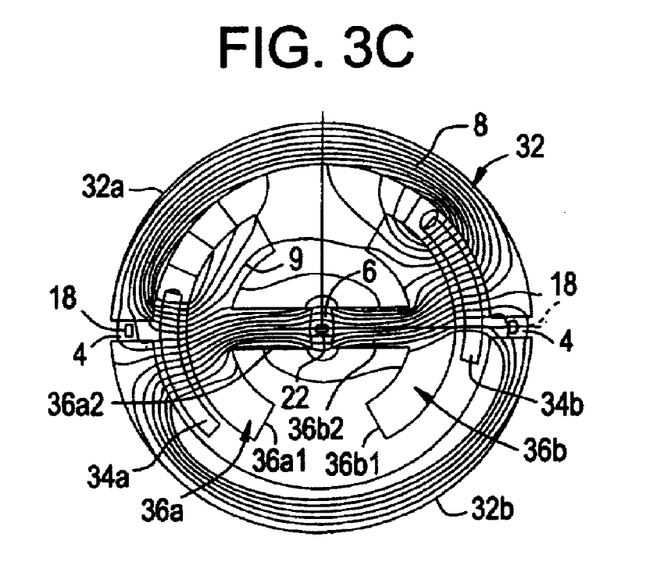
FIG. 3c is a view similar to FIGS. 3a, 3b but with the sensor magnets at a fully rotated counterclockwise position.

Magnets 34a, 34b are fixed relative to each other in diametric opposition and are rotatable as a unit between opposite extremities as shown in FIGS. 3b and 3c, for example, fifteen degrees as in the previously described embodiment.

As seen in FIGS. 3b, 3c in which the magnet portions 34a, 34b, are in the fully rotated extremities, the first arcuate shaped portions 36a1, 36b1 of the stator, respectively, extend beyond the closest end of the magnet portions.

Linear Hall Effect sensor 18 is mounted in air gap 4 of yoke 32, on either side, while reference linear Hall Effect sensor 22 is mounted in air gap 6. In this arrangement a magnetic field occurs in air gap 4 that changes linearly with angular rotation while the field through the linear second portions 36a2, 36b2 experiences essentially no change with rotation of the magnet portions and will only change as a result of magnetic decay.

Magnetic fields versus angular rotation at the sense 4 and reference 6 air gaps in a position sensor made in accordance with the invention according to FIG. 3 reflected a 732 G change for the linear Hall Effect sensor 18 upon full rotation and only a 2.2 G change for the linear reference Hall Effect sensor 22 for the same rotation. As noted above, the electrical output signal of the Hall Effect sensors is linear and in the form of y=mx+b. The term m changes as the signal decays. In accordance with a preferred embodiment, see FIG. 2c, the electrical output signal S1 of Hall Effect sensor 18 is corrected using the equation y=(m/ref)x+b where ref is the electrical output R1 signal from the reference Hall Effect sensor 22 which decays proportional to the magnet.

The compensation also keeps the error relatively low even for a bad magnet, for example, a 30% decay, limiting the error to approximately 5%.

Another advantage of position sensor 30 is that the reference sensor does not need to be positioned accurately. The field in reference air gap 6 is constant across the entire gap so side-to-side misalignment of the reference sensor is not critical. Position sensor 30 has no sensitivity to rotor play; although, it is sensitive to external fields because they couple onto yoke 32 and directly into the rotating field sense Hall Effect sensor 18. However, for many applications, external field sensitivity is not problematic; for example, when the position sensor is mounted within a separate metal housing which serves as a magnetic shield from external fields.

Figure 4:
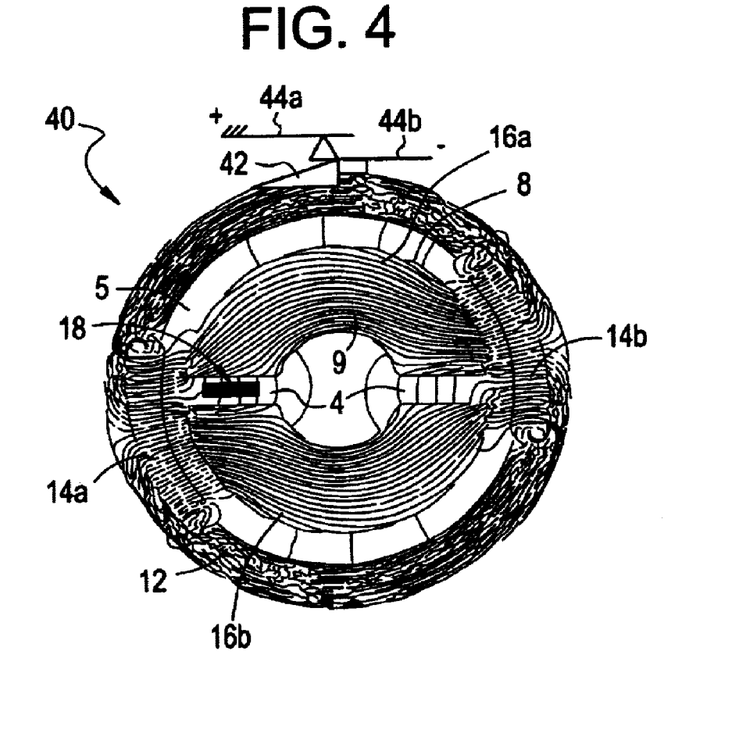
FIG. 4 is a view similar to FIG. 1a of another preferred embodiment having an electromechanical switch.

FIG. 4 relates to an embodiment in which a switch is used to provide an output signal at a fixed, preselected reference angle. An expected value is obtained at that angle using a fresh magnet and that value stored in memory in a suitable control circuit. During normal operation, the output at this preselected reference angle is compared to the stored expected value at that angle for any deviation from the expected signal. Any such deviation is used as a correction factor applied to the primary output signal. The second electrical output signal can be provided by various means, such as mechanical actuation of a switch at the reference angle, a photo diode and photo detector where the optical signal is inputted by the magnet rotating in front of it or a Hall Effect switch responsive to a preselected window of magnetic field values, for example, when the magnet is in its fully extended extremity.

With particular reference to FIG. 4, a view similar to FIG. 1b, position sensor 40 is shown having the structure of the prior art of FIGS. 1, 1a, 1b, described above, but has a ramp shaped protrusion 42 formed on rotatable yoke 12 at the reference location so that upon rotation of yoke 12 to that position, in the example shown, the fully rotated counter-clockwise position, contacts 44a, 44b will be closed to provide the reference position indication.

Figure 5:
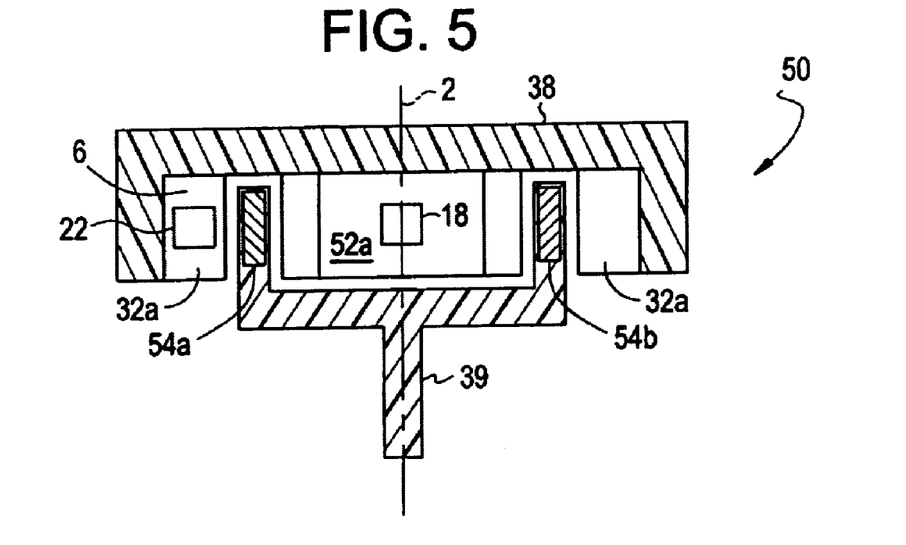
FIG. 5 is a cross sectional view taken on line 5—5 of FIG. 5a of a position sensor made according to another preferred embodiment.

The preferred position sensor 50 embodiment of FIGS. 5, 5a–5c comprises a stationary cylindrical, tubular yoke or outer ring 32, as in the FIG. 3 embodiment, and a stationary stator 52 with a pair of movable magnets 54a and 54b mounted for rotation in an annular space between yoke 32 and stator 52. Yoke 32 is formed of suitable soft magnetic material, such as iron, silicon-iron alloys and nickel-iron alloys as in the previously described embodiments. Yoke 32 is longitudinally split into first and second portions 32a, 32b, respectively, separated from each other by supplementary air gaps 6a of a selected width large enough to receive in either gap 6a a Hall Effect reference sensor 22 spaced from the two yoke portions. As shown in FIG. 5, yoke 32 is mounted in a cylindrical housing 38 formed of non-magnetic material.

Stator 52 comprises two generally semi-circular portions 52a, 52b formed of soft magnetic material, preferably a low hysteresis material such as silicon-iron or nickel-iron. The stator portions have a sense air gap 4 between their flat sides for placement of a linear Hall Effect sensor 18, spaced from each flat side and centered on the longitudinal axis 2 of the stator and yoke. Air gaps 4 and 6 extend along diametrical directions with the direction of air gap 4 forming an acute angle with the direction along which air gap 6 extends, in the embodiment shown, approximately 15 degrees. Magnets 54a, 54b are arcuately shaped and mounted on a rotor 39 made of non-magnetic material and adapted to move between one extremity at a reference angular position shown in FIG. 5a at which the center of the magnet is aligned with air gap 6a to an intermediate angular position or stroke shown in FIG. 5b, 15 angular degrees from the FIG. 5a position at which the center of the magnet is aligned with gap 4 and further, another 15 angular degrees to an opposite angular extremity or stroke shown in FIG. 5c at which the center of the magnet is located beyond the diametric direction along which air gaps 4, 6 extend. It will be noted that both ends of the outer flat walls defining air gap 4 are flared outwardly at 52a1 and 52b1. The arcuately shaped magnets overlap the flared gap at both extremities of the magnets' position, FIGS. 5a and 5c.

Figure 5A:
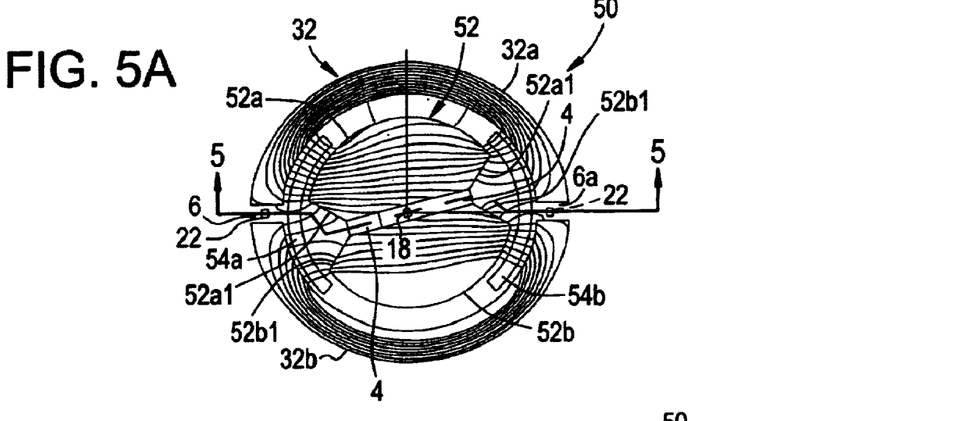
FIG. 5a is a view similar to FIG. 1a of the FIG. 5 embodiment with the magnets at a reference angular position, or zero stroke, at one extremity of the stroke.
Figure 5B:
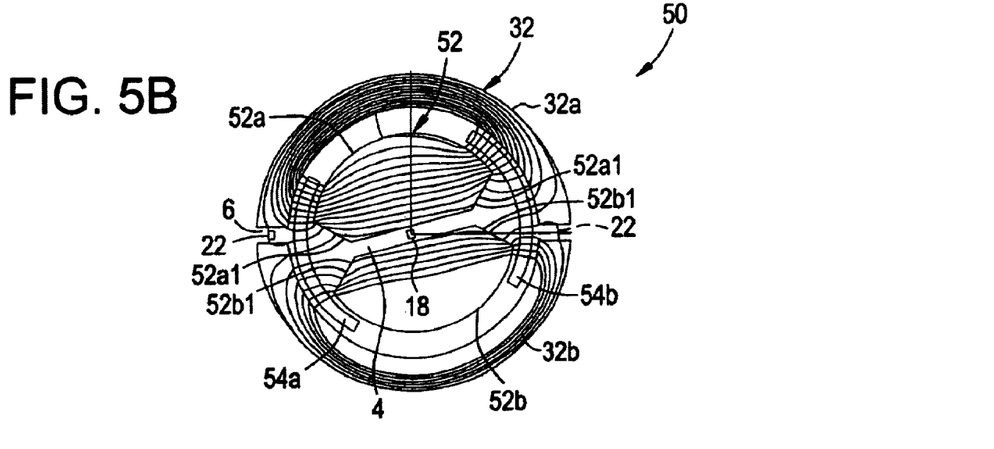
FIG. 5b is a view similar to FIG. 5a but with the magnets at mid stroke.
Figure 5C:
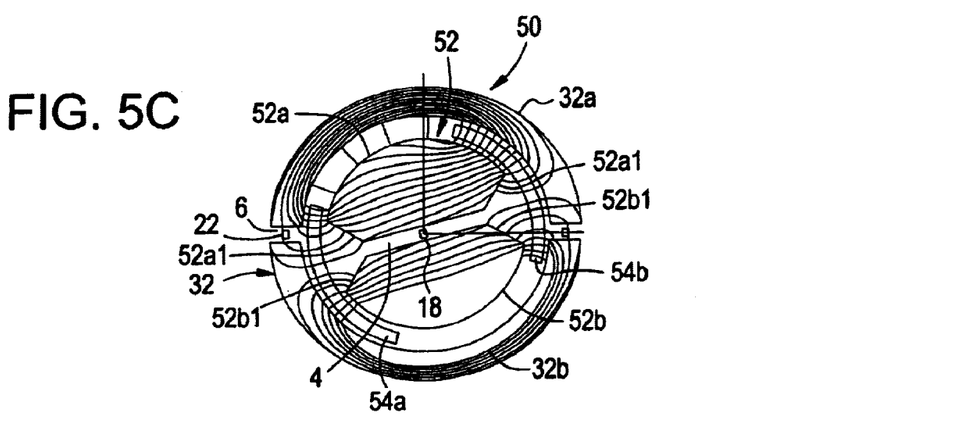
FIG. 5c is a view similar to FIG. 5a but with the magnets at the opposite extremity or full stroke.
Figure 7:
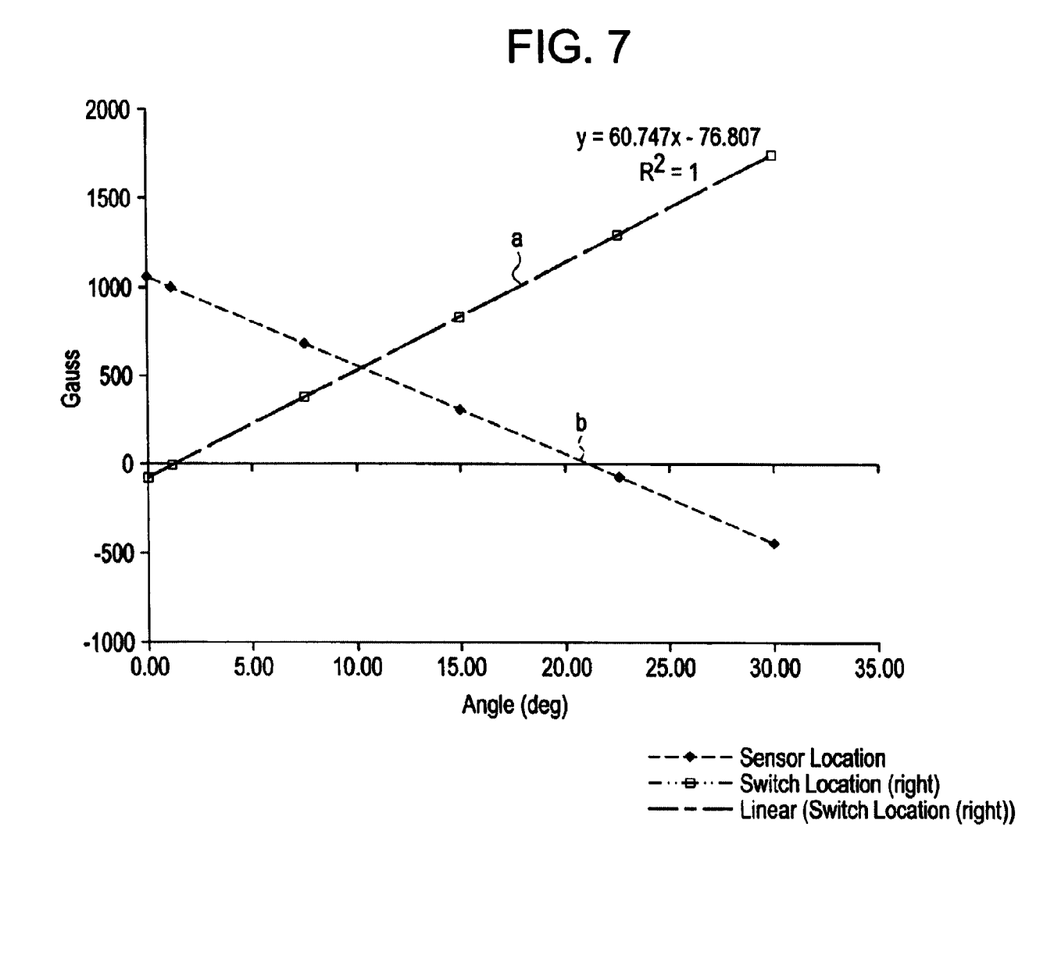
FIG. 7 is a graph showing flux density of the sense and reference sensors of the FIG. 5 position sensor.

In the nominal or reference position of FIG. 5a, the flux density through the reference air gap 6 is essentially zero and the flux density through the sensor air gap is at a maximum. As the rotor turns, the magnets rotate about the center point, longitudinal axis 2, the flux density in sense air gap 4 decreasing and the flux density in the reference air gap 6 increasing. The flux density at the sense and reference locations both change linearly with the angle of the magnet as shown in FIG. 7 which shows flux density in sensor air gap 4, line b, and reference air gap 6, line a, for the FIG. 5 position sensor.

The reference position of the magnets is selected by adjustment of the flares 52a1, 52b1 to be at an angular position slightly offset from zero, i.e., 1.25 degrees at which position the flux density is not quite zero. This allows the element being monitored to move beyond the reference position on its return stroke and back to the reference position of zero gauss so that there can be a stable starting point.

Several advantages occur with a zero field in a reference air gap. Firstly, the field can be accurately measured because any change in magnet strength will not affect the field strength in the gap at the reference position, the field remains at zero. Secondly, the impact of any Hall Effect sensor errors can be reduced because such errors are least at the quiescent voltage point. This occurs because the circuit gain is minimized at that operating point. Thirdly, the effect of the magnet temperature coefficient can be reduced because at that position, the field is zero. Furthermore, this results in providing the option of using a magnetic switch to measure the reference point.

A Hall Effect switch can be used in place of the linear hall sensor in the reference location (gap 6). The switch would be in the off condition as rotor 38 rotates around to the zero point and at that point the state changes providing a signal that the rotor is at the reference position.

If a linear Hall Effect sensor is used in the reference gap, it can be arranged so that the output is at a specific voltage at the reference angular position.

Once a signal is given that the rotor is at the reference angular position, the output of the sense Hall Effect sensor 18 can be measured and compared to a stored expected value. If the sense sensor value differs from the expected value, the difference can be used to set a diagnostic flag or it can be used to correct the signal of Hall Effect sensor 18 (in air gap 4).

The correction can be made by taking the output signal which is in the form of a linear equation, $y=mx+b$, and multiplying the correction factor to get $Yc=(mx+b)*(1+c)$ where c is the percent difference in output.

It will be realized that other methods of correction could also be used. For example, just the gain could be corrected; $Yc=mx(1+c)+b$, or just the offset could be corrected, $Yc=mx+b*(I+c)$, depending on which has the most impact.

Figure 8:
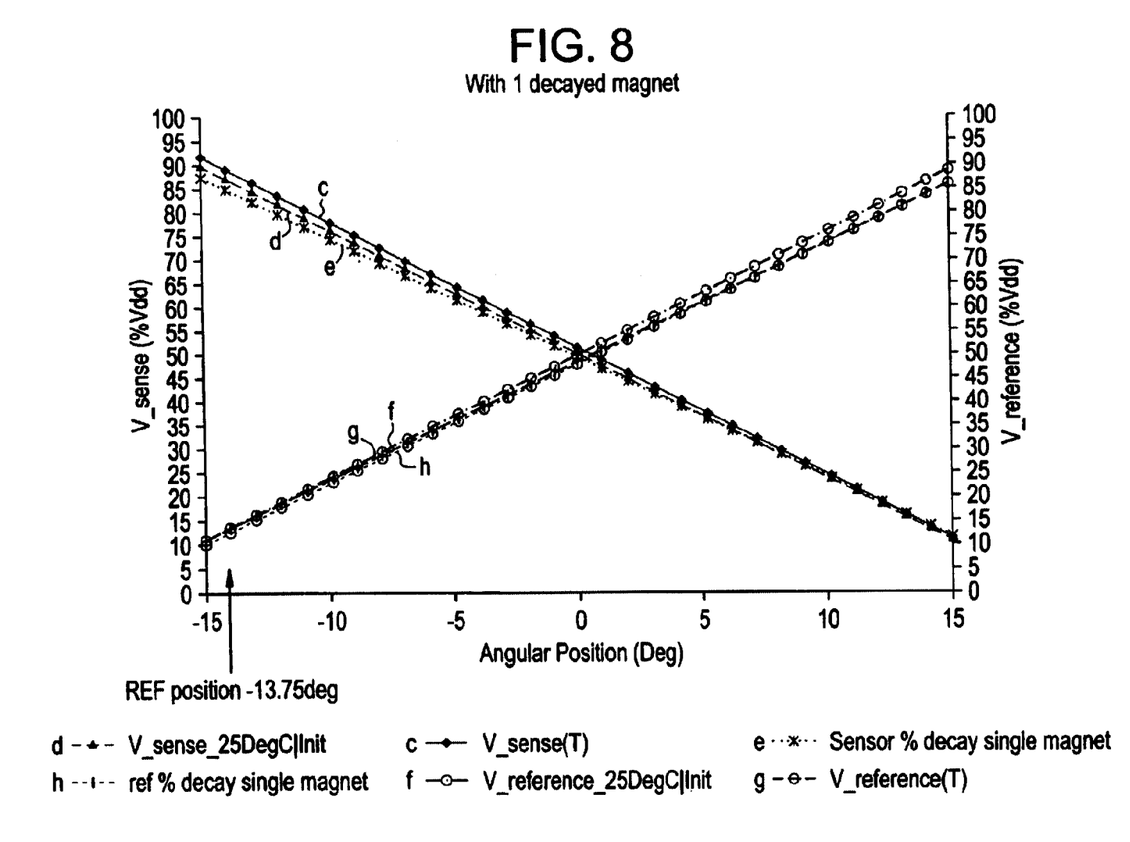
FIG. 8 is a graph of sense and reference sensor outputs of the FIG. 5 embodiment with and without magnetic decay and with and without one bad magnet.

In the FIG. 5 embodiment, it is preferred to multiply the entire equation by the correction factor which includes a combination of gain and offset shifts. With reference to FIG. 8, a graph of output voltage for linear sense (18) and linear reference (22) sensors vs. angular position of the magnets is shown for the FIG. 5 embodiment. Both sensors are programmable linear Hall Effect sensors and the span or stroke is 30 degrees.

Line d is the basic sense signal at room temperature and the temperature compensation TC bit set at nominal value to match the magnet and without drift on the Hall sensor, Line c is the same signal at 150 degrees C. and the maximum TC bit error that can occur. It also includes the maximum amount of lifetime drift on the Hall sensor. The TC bit error can lead to either an increase in slope or a decrease in slope since the TC errors are randomly distributed around the nominal TC bit value. In this example, the TC error shows that the slope has increased.

Line f is the basic reference signal at room temperature and the temperature compensation bit set at nominal value to match the magnet and without drift on the Hall sensor. Line g is the same signal at 150 degrees C. and the maximum TC bit error that can occur. It also includes the maximum amount of lifetime drift on the Hall sensor. The TC bit error can lead to either an increase in slope or decrease in slope since the TC errors are randomly distributed around the nominal TC bit value. In this example the TC error shows that the slope decreased. This gives the maximum difference between the two Hall sensors, one increases and one decreases. In other words, the drift of the two Hall sensors occur in opposite directions.

Once the magnet decays, it has a different effect depending on the Hall drift direction. In one case, the magnet decay actually helps to make up for the increased gain from the hall sensor drift. In the other case, the magnet decay adds to the Hall sensor drift making it worse.

The same plot shows how the aged temperature Hall Effect sensor's output changes if one of the two magnets were to fail by decreasing in strength by 4 percent, curves h and e, the sense and reference curves show that there is a further decrease in the slope with the decayed magnet. This decrease can be corrected by taking the delta in the sense 18 output at the reference position and then applying correction.

Figure 9:
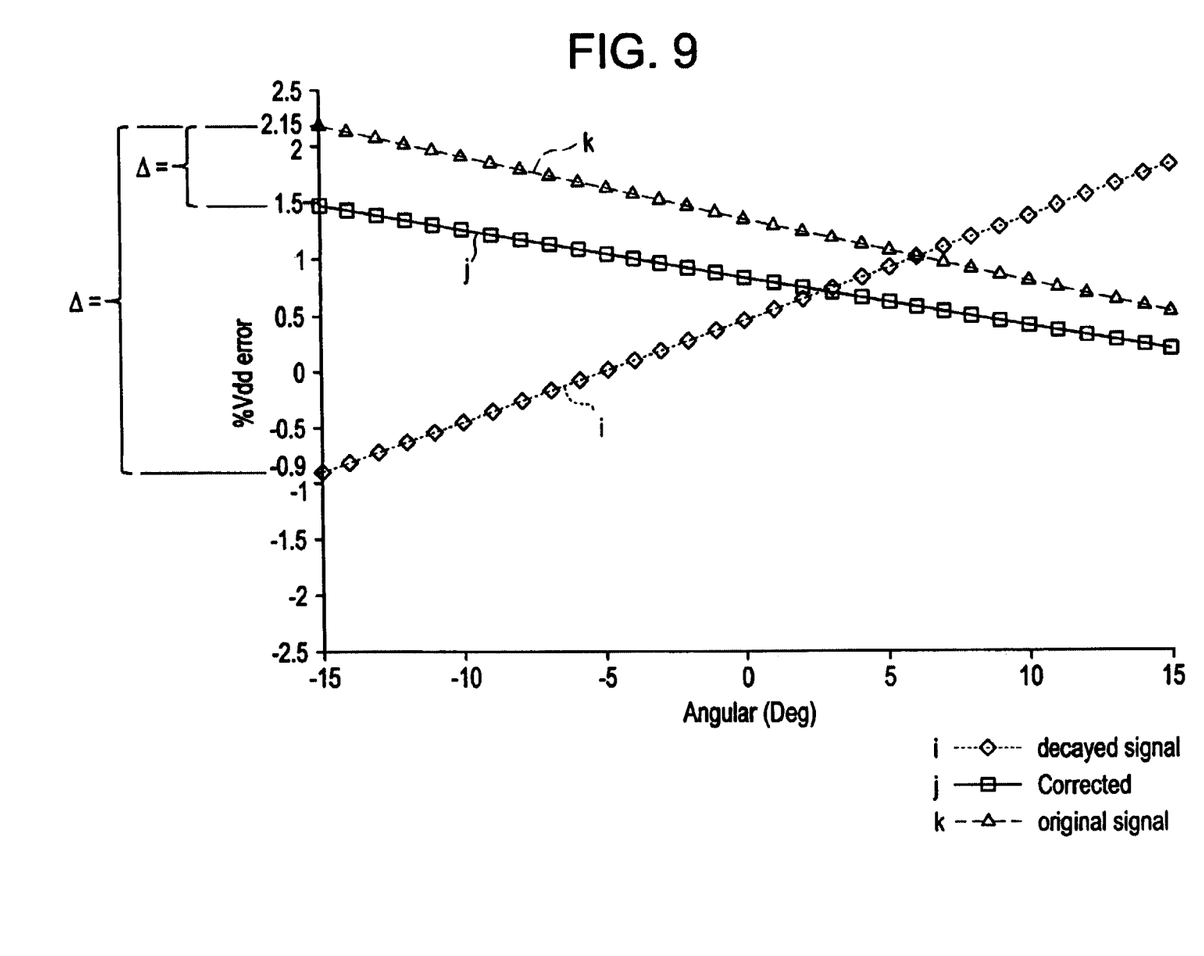
FIG. 9 is a graph showing sense output error of the FIG. 5 position sensor with 4% decay on one magnet for the original signal, decayed signal and corrected signal.

FIG. 9 is a graph of sensor 18 output error with a 4 percent decay of one magnet vs. angular position. This graph shows the error with Hall sensor temperature effects combined with Hall sensor aging and magnetic decay. This is based on a worse case setting of the Hall Effect sensor IC temperature compensation parameters and shows that the total error is reduced from 2.15 percent to 1.5 percent Vdd and the delta error in the output is reduced from 3% to 0.5% limiting the output change over time to 0.5%. This is a significant self correction for applications that require high accuracy. Not only does the compensation correct for magnetic decay, it also corrects for any drift or temperature effects on the Hall sensor.

Figure 10:
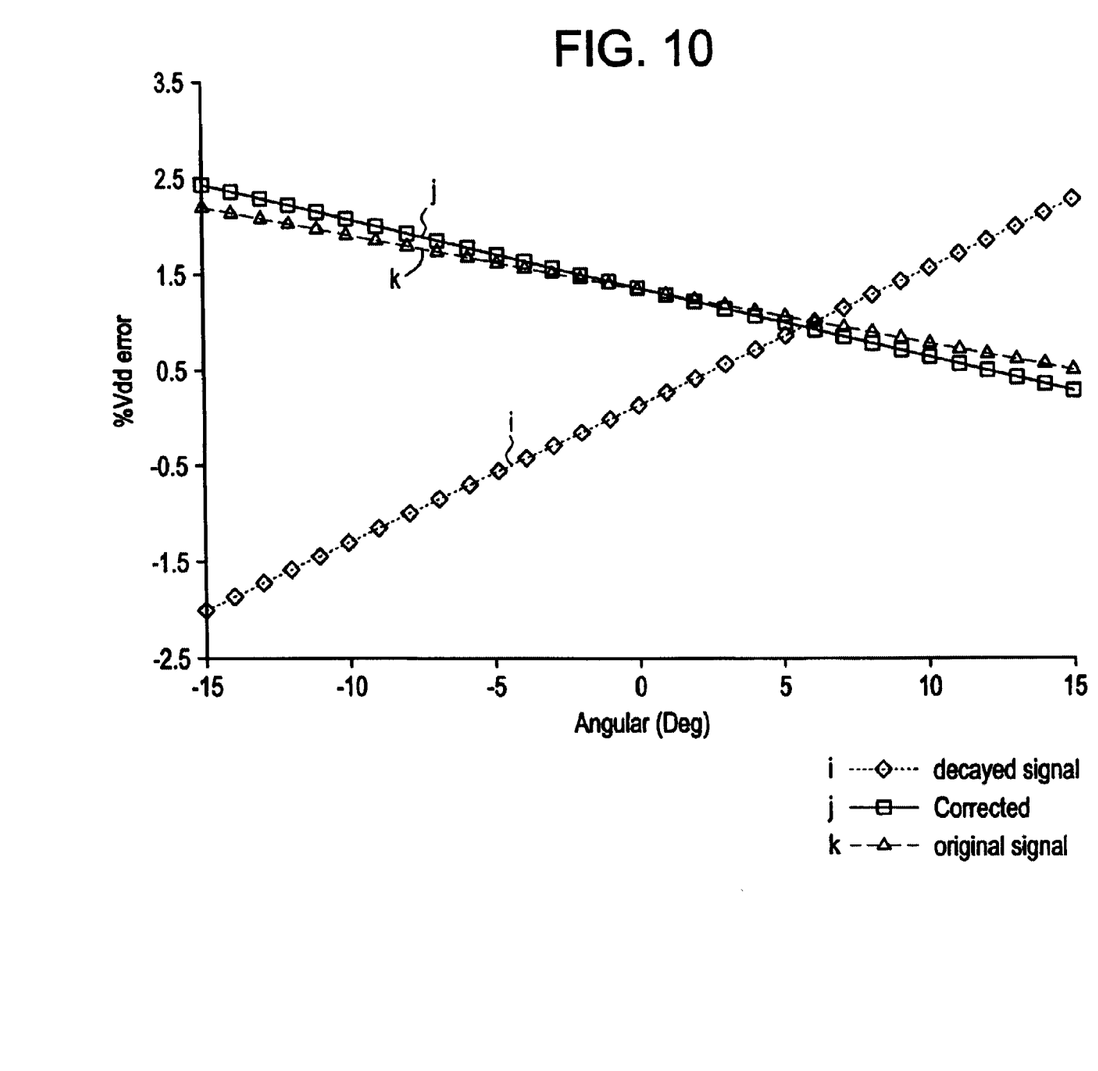
FIG. 10 is a graph showing sense output error of the FIG. 5 position sensor with 4% decay on both magnets for the original signal, decayed signal and corrected signal.

FIG. 10 is a graph similar to FIG. 9 but for a 4% decay on both magnets 54a, 54b. In this case the FIG. 5 embodiment still keeps the larger error within tight limits, less than 2.4% and keeps the delta to less than 0.5%.

The reference signal can be used in several ways at a system level, that is, in the specific application in which the position sensor is used. For example, in an automotive transmission to monitor the position of a selected hydraulically moved object. One way the reference signal can be used is as a calibration tool at the assembly plant. This can be particularly effective since such object positions are not necessarily linear functions of applied hydraulic pressure because of various tolerances in the system. Such a calibration procedure is shown in FIG. 11.

At step 102, the position sensor is assembled to a transmission. At step 104, the transmission is run and the position of the controlled object is changed until it zeros in on the reference position. The output voltage at the desired position is read at step 108. This voltage is stored at 108 and at step 110 the sense signal (sensor 18) is read at this position and is stored at step 118 for an ideal or expected setting. The object is run through the full stroke range at step 114 with the input control signal mapped to the position output. The mapped data is stored in a look up table in step 116 and in step 118 the mapped data is used to control the position of the object based on other inputs as desired.

Figure 11:
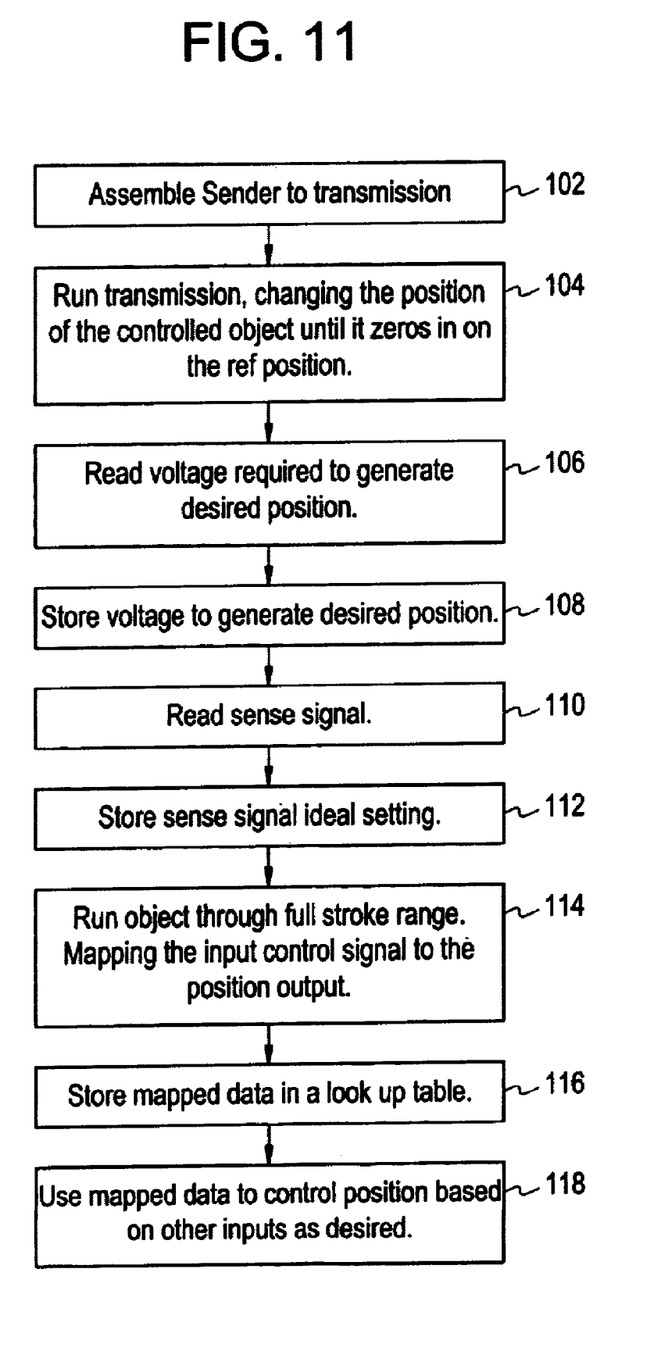
FIG. 11 is a chart showing the steps of a procedure for calibrating the FIG. 5 position sensor at the assembly plant.

The FIG. 11 procedure works well with a linear sensor in the reference position because it allows the system to hunt for and zero in on the reference position by going back and forth past the reference position in ever smaller increments until it comes within the desired resolution.

Once the transmission is installed in the vehicle, the reference signal can still be useful to control operation. If the control system design is set-up such that the object being controlled occasionally goes past the reference position during its normal operation, as discussed above with reference to the reference angular position of 1.25 degrees, so that it can actually go past the reference position and return, then the reference signal can be used as a trigger to sample the sensor 18 output and make correction, if necessary. This correction will keep the system stable and accurate over the long 15–20 year vehicle life.

Figure 12:
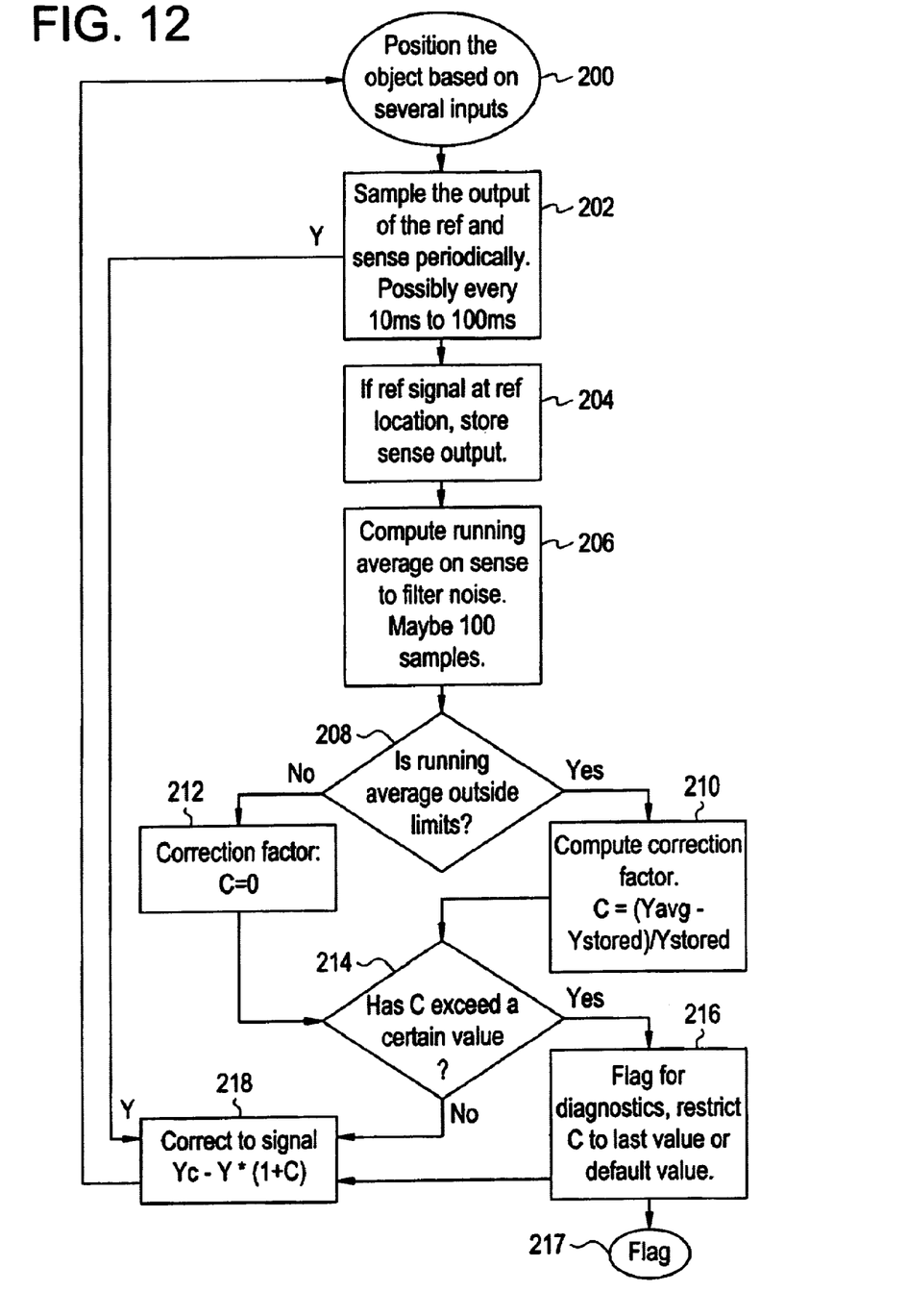
FIG. 12 is a flow chart showing a technique for sampling the sense output at the reference position and making corrections to keep the system stable and accurate over a prolonged period.

FIG. 12 shows a control algorithm for this use. At process step 200, the object to be controlled is positioned based on several inputs. At process step 202, the output of the reference (22) and sense (18) sensors are sampled periodically, for example, every 10 ms to 100 ms and the results are forwarded to step 204 as well as to step 218, to be discussed. At step 204, if the reference sensor 22 is at the reference location, the output of sense sensor is taken and stored. The running average on sense to filter noise is computed for a selected number of samples, e.g., 100, at step 206. At decision step 208 the running average is compared to selected limits, if the average is outside the limits the routine goes to step 210 at which the correction factor is computed. The correction factor c=(Yavg−Ystored)/Ystored. The routine then goes to step 214.

If the running average is within the limits in step 208, the next step is to assign zero as the correction factor (c) and then on to step 214. Decision step 214 looks to see if the correction factor exceeds a certain value, if yes, at step 216, a flag 217 for diagnostics is set, c is restricted to the previous value or to a default value. If the correction value does not exceed the certain value then the routine goes to step 218 at which the sense signal is corrected.

Another way the reference signal can be used is to have the control element being monitored go to the zero position at some known condition, for example, in the transmission example mentioned above, when the engine is shut off. Then, just at key on, before sending a command to move the control object, the reference and sense outputs are read and correction made to the sense output, if needed. By reading the reference and sense outputs at a fixed position an additional plausibility check is provided. If the reference and sense outputs do not match expected values to within a certain amount, there might be something wrong with the system, such as a binding element or leakage in the hydraulic circuit.

A third way the reference signal can be used is for service diagnostics. If the transmission of the stated example is brought in for repair, the sense voltage can be read out by the repair person and compared to the stored ideal or expected value. If the difference is large, it would indicate a problem with the sensor. If the difference is not large, it would indicate that other areas would need to be checked that could affect the location of the control object.

Figure 6A:
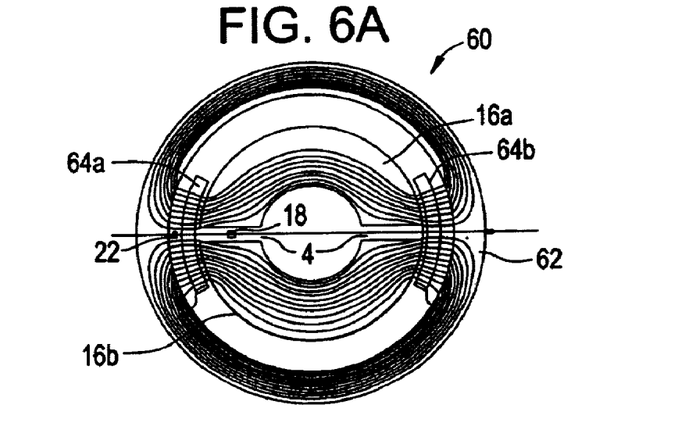
FIG. 6a is a view similar to FIG. 1a of another embodiment of the invention with the magnets at a reference, zero angular position.
Figure 6B:
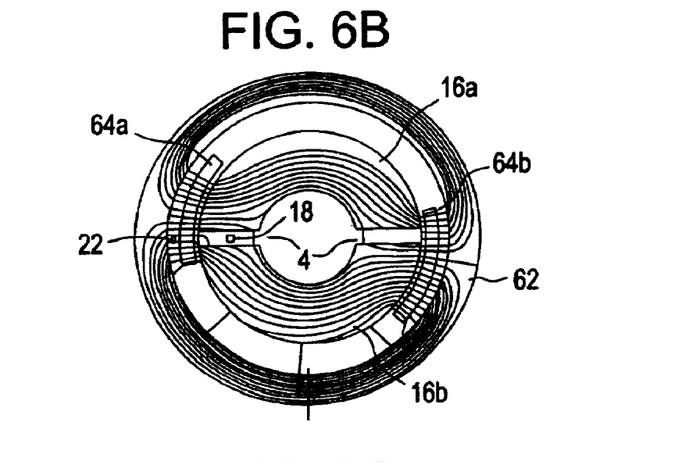
FIG. 6b is a view similar to FIG. 6a but with the magnets fully rotated clockwise to one extremity.
Figure 6C:
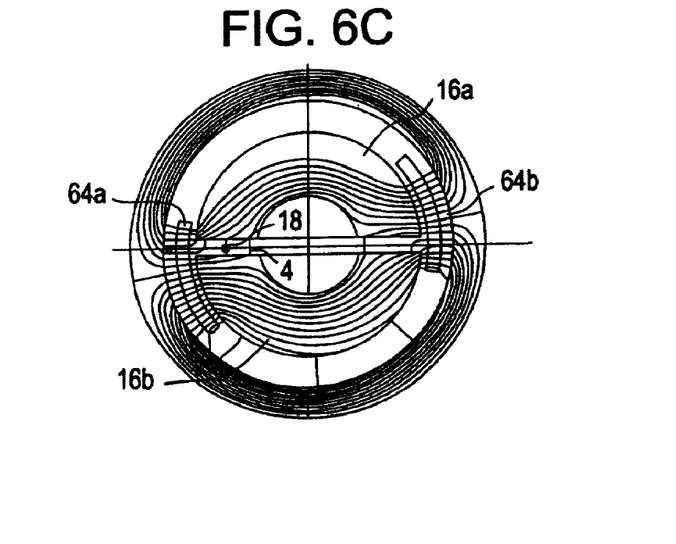
FIG. 6c is a view similar to FIG. 6a but with the magnets fully rotated counterclockwise to the opposite extremity.

Another embodiment which provides both a sense and a reference signal is shown in FIGS. 6a, 6b, 6c. Position sensor 60 is similar to position sensors 30 and 50 of FIGS. 3 and 5 in that it includes first and second arcuately shaped magnets 64a, 64b rotating in an annular space formed between yoke 62, in this case a continuous cylindrical yoke, and stator portions 16a, 16b. However, in this embodiment, reference sensor 22 is disposed between one of the magnets, magnet 64a as shown, however, it could be either magnet, and yoke 62 so that it has improved insensitivity of the reference sensor to external magnetic fields. Otherwise, the operating principles operate as previously described.

The FIGS. 2–6 embodiments have all the advantages of the FIGS. 1, 1a, 1b position sensor while providing diagnostic and correction capability for magnetic decay and other magnet errors.

While the invention has been described in combination with the specific embodiments thereof, it is evident that many alternatives, modifications and variations will be apparent to those skilled in the art in view of the foregoing description. For example, the configuration of the magnet portions of FIG. 3 can be modified to reduce the field strength of the reference Hall Effect sensor to be of the same magnitude as that of rotating field sensor in order to reduce the Hall Effect sensor gain mismatch between the two sensors. Although the preferred embodiments described supra employ two magnets, it is within the purview of the invention to use a single magnet along with the relevant half of the symmetrical structure.

It is intended that the appended claims be interpreted as broadly as possible in view of the prior art to include all such variations and modifications.

What is claimed:

1. A position sensor comprising:
    a stationary tubular shaped yoke formed of magnetic material having first and second generally semi-circular portions spaced from one another forming a first gap,
    a rotatable coupling member having a center of rotation,
    first and second movable, arcuately shaped magnets mounted in fixed, diametrically opposed relation to each other on the coupling member and being disposed within and being evenly spaced from the tubular shaped yoke, the magnets each having one side facing toward the yoke and another side facing toward a center of rotation of the coupling member,
    first and second stator elements formed of magnetic material, each stator element having an arcuately shaped outer periphery first stator portion radially spaced from a respective arcuately shaped magnet on the side of the magnet facing the center of rotation, a second stator portion extending from each respective first stator portion diametrically toward the center of rotation and the first and second stator elements being spaced from one another forming a second gap,
    the coupling member rotatable to move the magnets between first and second extremities,
    a first Hall Effect sensor having a first electrical output disposed in the first air gap exposed to magnetic flux which varies with the rotatable position of the magnets and a second Hall Effect sensor having a second electrical output disposed in the second gap exposed to magnetic flux which is essentially independent of the position of the magnets.

2. A position sensor according to claim 1 in which the center of the magnet portions are aligned with the first gap at a position intermediate to the first and second extremities.

3. A position sensor according to claim 1 in which the magnet portions are magnetized and positioned on the coupling member so that the poles of the first magnet are in reverse orientation relative to the poles of the second magnet along a diametric direction.

4. A position sensor according to claim 1 further comprising a compensation circuit having first and second inputs and an output, the first and second Hall Effect sensor electrical output signals inputted to the first and second inputs of the compensation circuit, respectively, the circuit having a microprocessor for applying the second Hall Effect sensor electrical output signal as a correction factor for the first Hall Effect sensor output signal to compensate for magnetic decay.

* * * * *